United States Patent [19]
Wakabayashi et al.

[11] 3,941,757
[45] Mar. 2, 1976

[54] METHOD FOR PRODUCTION OF COPOLYMER OF CYCLOPENTENE

[75] Inventors: Hiroshi Wakabayashi; Toru Nakagawa; Shoichi Matsumura; Shigeru Fujii, all of Kobe, Japan

[73] Assignee: Kanegafuchi Kagaku Kogyo Kabushiki Kaisha, Osaka, Japan

[22] Filed: July 31, 1974

[21] Appl. No.: 493,387

[30] Foreign Application Priority Data
July 31, 1973 Japan.............................. 48-86502

[52] U.S. Cl.......... 260/80.78; 260/82.1; 260/88.2 E; 260/88.2 D; 260/88.2 F; 260/93.1; 260/93.3; 260/879
[51] Int. Cl.².... C08F 2/06; C08F 4/14; C08F 4/22; C08F 232/08
[58] Field of Search........... 260/80.78, 88.2 D, 82.1, 260/88.2 E, 88.2 F, 93.1, 93.3, 879

[56] References Cited
UNITED STATES PATENTS

| | | | |
|---|---|---|---|
| 3,707,520 | 12/1972 | Pampus et al. | 260/82.1 |
| 3,772,255 | 11/1973 | Bell | 260/88.2 D |
| 3,816,382 | 6/1974 | Streck et al. | 260/93.1 |
| 3,830,877 | 8/1974 | Dall' Asta et al. | 260/879 |
| 3,836,593 | 9/1974 | Streck et al. | 260/88.2 E |

*Primary Examiner*—Joseph L. Schofer
*Assistant Examiner*—F. R. Cervi
*Attorney, Agent, or Firm*—Moonray Kojima

[57] ABSTRACT

Method of producing a copolymer of cyclopentene comprising the steps of preliminarily mixing in an inert solvent a polycyclic olefin having at least one double bond in a ring, with a metallic compound containing tungsten or molybdenum as a catalyst, to form a complex compound with each other; polymerizing cyclopentene in an inert solvent in the presence of a catalyst system comprising a metallic compound of tungsten or molybdenum and an organo metallic compound of Group I–IV of the Periodic Table, and then adding the complex compound to the polymerizing cyclopentene system, thereby to produce a novel copolymer of cyclopentene.

11 Claims, No Drawings

METHOD FOR PRODUCTION OF COPOLYMER OF CYCLOPENTENE

BACKGROUND OF THE INVENTION

This invention relates to a method of producing copolymers of cyclopentene, and to novel copolymers of cyclopentene. More particularly, this invention relates to two component copolymers consisting of cyclopentene and a polycyclic olefin, and to three component copolymers consisting of cyclopentene, polycyclic olefin and monoolefin, and a method for producing same.

Recently, polymers obtained by the polymerization of cycloolefin, especially 1,5-trans-polypentenamer obtained by ring opening of cyclopentene has been widely discussed as a new elastomer and is well known for its characteristic properties. However, since the polypentenamer has an essential structure of trans-configuration and accordingly has a tendency to easily crystallize, one defect of this polymer as an elastomer is loss of its elastic property by crystallization when exposed to an atmosphere of low temperature. Moreover, although the processability of a cyclopentene homopolymer having a relatively low molecular weight such as Mooney viscosity in the range of 40 to 80, is not so poor, the processability of a cyclopentene homopolymer having a Mooney viscosity of about 100 to 150 and accordingly having special feature of the polypentenamer is considerably poor. Further, the tear resistance of the homopolymer is rather small for practical use. As is well known, increase of low temperature proof property can be achieved by decreasing the degree of crystallization and by retardation of crystallization velocity. However, it was impossible to improve the low-temperature proof property of the homopolymer by use of conventional techniques. For example, although the resistance to low temperature is expected to improve when the content of the cis-configuration in the homopolymer is increased, experimental results show that such an effect can not be achieved unless the content of cis-configuration is considerably increased. However, such increase results in sacrifice, usually to a fatal degree, of other necessary properties.

In the prior art, there are two methods of copolymer production. One is a method of copolymerization charging two kinds of monomers at the beginning of the polymerization. Another is a method applying a random rearrangement reaction between two kinds of homopolymers in the presence of a random rearrangement catalyst such as tungsten.

Using the former method, a polycyclic olefin may be chosen as a component of copolymer, since its reactivity compared with that of cyclopentene is generally greater and since its ability to coordinate to tungsten which may be used as an active component in a catalytic system, is different from that of cyclopentene. In that case, it is very difficult to prepare a copolymer of uniform composition in molecular structure. The distribution of composition in the polymer molecule and the sequence distribution are seen to have a tendency to be very broad. Further as disclosed in Unexamined Japanese Patent Public Disclosure Ser. No. 47(1972)-3534 and Examined Japanese Patent Publication Ser. No. 47(1972)-5823, there exists a side reaction which increases the molecular weight of copolymers, or its Mooney viscosity, remarkably in the copolymerization reacting containing a polycyclic olefin as a component of copolymer. Moreover, there is no improvement of physical properties of the resulting copolymer.

Using the latter method, as seen in the Examples disclosed in Unexamined Japanese Patent Publication Ser. No. 48(1973)-12383, there exists a side reaction which breaks down the main chain of the original polymers, thereby generating degradated molecules of low molecular weight. This prevents the rearrangement reaction from continuing for a sufficient time. Moreover, the process itself is disadvantageous, since it is necessary to mix two viscous solutions of two polymers in order to react them to each other. Furthermore, another undesirable side reaction, such as isomerization from cis to trans, also occurs and hence no desirable copolymer can be obtained practically.

SUMMARY OF THE INVENTION

The present invention aims to improve the physical and mechanical properties of the homopolymer such as anti-hardening property at low temperature, resistance to tear and processability, and broadening the region where the polymer has the appropriate properties as an elastomer.

After extensive study of the foregoing problems, the present inventors have discovered a new method for copolymerization and have succeeded in synthesizing a copolymer which has improved low temperature proof properties, and moreover, at the same time, has improved processability and good tear resistance at high molecular weight of the polymer shown by high Mooney viscosity.

The present inventors have discovered that a copolymer having improved resistance to low temperature, improved tear resistance and good processability can be produced in good yield if copolymerization is carried out using the following procedure. A comonomer solution, before adding to cyclopentene, is preliminarily mixed with a metallic compound containing tungsten or molybdenum as a catalyst, to form a complex compound with each other by adding the catalyst to the comonomer solution. Thereafter, the solution containing the catalyst is added to a cyclopentene solution under polymerization.

The method of the present invention surprisingly and unexpectedly did not produce an substantial stepwise increase of molecular weight of the copolymer or Mooney viscosity, as compared with the homopolymer produced in accordance with the method disclosed in Japanese Patent Publication Ser. No. 47(1972)-5823.

It was discovered that when a comonomer of polycyclic olefin is used without forming a complex compound with a tungsten catalyst, that is, in case of the monomer solution is added to cyclopentene for copolymerization without preliminarily mixing with the catalyst, with the addition of the comonomer solution comprising polycyclic olefin, a considerable increase of molecular weight of the resulting polymer took place and the control of the molecular weight was almost impossible, thus, sometimes generating a gel. This is a considerable disadvantage from the view point of industrial production.

Therefore, the copolymer produced by the method of the present invention is completely new. The method itself also is novel. It is characterized by easy control of the molecular weight of the obtained polymer, in an industrial production without any accompanying considerable stepwise increase of the molecular weight of the copolymer. Furthermore, the inventive method does not produce any gel formation. Moreover, the method of the present invention also improves various properties of the resulting copolymer.

DETAILED DESCRIPTION OF PREFERRED EMBODIMENTS

As a comonomer used in this invention, polycyclic olefin which has at least one carbon-carbon double bond in the cyclic structure of the molecule, may be used. Practical examples are dicyclopentadiene, norbornene, norbornadiene and tricyclopentadiene, etc. Of course, the method of the invention is not limited to those examples. The amount of such polycyclic olefin to be used is between 1 to 50 weight percent, and more preferably between 1 to 30 weight percent based on the amount of cyclopentene.

Ring opening polymerization of cyclopentene can be carried out, as is known, by using a catalytic system consisting of a metallic compound (A) containing tungsten or molybdenum which is soluble in an inert solvent and an organo-metallic compound (B) belonging to the Groups I-IV of the Periodic Table. In some cases, a cocatalyst (C) may also be used. Although any one of well known compounds used widely as rearrangement catalyst of olefin can be used, as the metallic compound (A) containing tungsten or molybdenum, such metallic salts of tungsten or molybdenum as $WCl_6$, $WCl_5$, $WCl_4$, $MoCl_5$, and $MoCl_3$, etc are preferred for use from the standpoint of their catalytic activity in polymerization. Especially favorable results can be obtained by using a catalytic solution consisting of tungsten oxide ($WO_2$, $WO_3$) and aluminum chloride, and is more preferred from the standpoint of high activity in polymerization.

As the organo-metallic compound (B) belonging to the Groups I-IV of the Periodic Table, such known compounds can be used, as for example, organolithium compounds, organomagnesium compounds, organoaluminum compounds, organotin compounds and organosilicon compounds, etc. Especially preferred are organoaluminum compounds from the standpoint of its catalytic activity in polymerization. As organo aluminum compounds, although not limited thereto, there may be used $Al(C_2H_5)_3$, $Al(iso-Bu)_3$, $(C_2H_5)_2AlCl$ and $C_2H_5AlCl_2$, etc, and especially, tri-alkyl aluminum compounds are more preferred.

As the co-catalyst (C) any one of known compounds can be used, such as epoxide compounds, alcohols, and peroxides, etc.

The molar ratio of catalytic components (A), (B) and (C) may be used in a wide range, such as, for example, the ratio of B/A may be preferably within the range of 0.1/1 to 50/1, or more preferably in the range of 0.1/1 to 10/1. The ratio of C/A may be preferably within the range of 0 to 10/1, although no special limitation exists. Further, the amount of catalytic component (A) to be used in the present invention is from 0.01 to 10 millimol percent based upon the amount of cyclopentene.

In the polymerization of cyclopentene using a catalytic system such as mentioned above, although the molecular weight of the resulting polymer can be regulated by the regulation of the amount of catalyst and other polymerization conditions, copolymerization with an alpha olefin or a beta olefin is itself an effective procedure for regulation of molecular weight of the obtained polymer. As alpha olefin or beta olefin, there may be used, for example, ethylene, propylene, 1-butene, 2-butene, 1-pentene and 1-hexene. A suitable amount of monoolefin may be within the range of 0.01 to 10 weight percent based on the weight of cyclopentene.

Copolymerization of cyclopentene in the method of the present invention may be carried out in an inert solvent such as aliphatic hydrocarbon, alicylic hydrocarbon, aromatic hydrocarbon and halogenated hydrocarbon. Some examples of such inert solvents are cyclohexane, n-hexane, toluene and chlorobenzene. The solvent should be purified by any suitable method, to remove water and other impurities which destroy the catalytic activity.

The polymerization temperature may be preferably within a broad range of from −60°C to 70°C, and more preferably within the range of from −30°C to 30°C.

The method of the present invention can be carried out, generally, in the following way. At first, a predetermined amount of the above disclosed tungsten or molybdenum catalyst is added to a solution of cyclopentene in a suitable inert solvent, such as above disclosed, at room temperature. Then, the solution is cooled down to a temperature between −10°C and 0°C, and successively, a predetermined amount of the above disclosed organoaluminum compound is added to the solution. Polymerization reaction proceeds. At the same time, a solution of polycyclic olefin containing a certain amount of catalyst is gradually charged into the polymerization system of cyclopentene.

When the conversion rate reaches a desired degree, a known technique is applied for recovery of the obtained polymer. That is, after adding alcohol, as a stopper for polymerization, and an anti-aging reagent in an amount of several percent, the obtained polymer solution is treated with hot water, industrially, to separate the polymer in solution and then the polymer is dried using a suitable dryer.

A mixed solution consisting of a metallic compound containing tungsten or molybdenum and a comonomer is prepared at room temperature; whereupon, a complex compound between the catalyst and the monomer is rapidly formed in the solution. In this case, although there exists no special limitation on the amount of weight ratio between the inert solvent and the comonomer and on the amount of molar ratio between the tungsten catalyst and the comonomer, it is of course, necessary to carry out the polymerization in such a range of comonomer concentration wherein the homopolymer of the comonomer is not generated. That is, the ratio of comonomer to inert solvent is preferably within the range of 10/1 to 0.01/1 in weight and the molar ratio of comonomer to tungsten catalyst is also preferably between 500/1 to 50.0/1. Molybdenum catalyst may be substituted in the same amounts.

Various method can be used for adding the mixed solution of catalyst and polycyclic olefin thus prepared as mentioned above into the solution of cyclopentene under a polymerization reaction. The adding can be carried out at any time from the beginning of to near the end of the polymerization process. From the standpoint of industrial production, the fact that every feed in the method of the present invention can be performed continuously has a significant effect on the production. If the copolymerization is carried out by feeding continuously a comonomer which is not preliminarily formed to a complex compound, the molecular weight of the obtained polymer becomes so high as to be uncontrollable and gel formation occurs, whereupon the operation must be stopped.

When a copolymer obtained by copolymerization of two kinds of monomers charged at the same time before the beginning of polymerization, is compared with a copolymer obtained by the method of the present invention, the former elastomer is obviously scarce in stickness and in transparency. For example, when dicyclopentadiene is used as a comonomer, the former elastomer prepared by the conventional technique can be seen to contain a certain amount of fraction insoluble to hot n-hexane extracted by a Soxhlet's extractor. The insoluble part was found to be a homopolymer of dicyclopentadiene from an infrared spectroscopy test. This conclusion proved that the copolymerization using conventional techniques did not take place smoothly. Moreover, using conventional polymerization techniques, if the amount of comonomer exceeds 5%, a remarkable tendency to gel formation exists and accordingly there is a severe problem of copolymerizing a polycyclic olefin in a higher content. In the case of the method of the present invention, no gelation occurs even if a substantial amount of comonomer is used for copolymerization. This has great merit in industrial production. Chemically, gelation is considered to have occured by the same side reaction which results in substantial stepwise increase of molecular weight of the obtained polymer in copolymerization.

The elastomer obtained by the method of the present invention has a tendency to crystallize in a smaller degree than the homopolymer. Further from the results of extraction by a Soxhlet's extractor with n-hexane, it was proven that the copolymer does not contain any fraction insoluble to hot n-hexane. Accordingly, it can be concluded that the copolymer obtained by the method of the present invention is a completely copolymerized substance.

Furthermore, when compared with the molecular weight of a homopolymer of cyclopentene obtained by component polymerization of cyclopentene, the molecular weight of the copolymer obtained by copolymerization using the same conditions was found to be almost the same. This means that any remarkable side reaction which would substantially stepwise increase the molecular weight of the resulting product does not take place in the method of the present invention.

The copolymer obtained by the method of the present invention can be used for tires and other rubber goods which are widely used in industry.

In the following description, the invention will be further explained with several examples, which examples are not to be construed in any limiting sense.

EXAMPLE 1.

a. A method of preparation of polymerization catalyst.

Under a nitrogen stream shielded from moisture, after 10g of anhydrous tungsten oxide (43.2 millimoles) and 17.3 g of aluminum chloride (130 millimoles) were mixed and pulverized intimately, 100 ml of chlorobenzene was added to the mixture and heated at 180°C for 7 hours under a reflex condenser. After cooling the mixture to room temperature, 95 ml of the upper clear liquor was taken out by an injector and transferred into another flask under a nitrogen atmosphere. The concentration of tungsten in the catalyst system solution thus obtained was 0.160 millimole/ml. This catalyst will be referred to hereinbelow as tungsten catalyst.

b. A polymerization process was carried out in a polymerization vessel with an agitator, to which nitrogen and other various agents necessary for polymerization can be introduced by injectors.

The polymerization was carried out completely under a nitrogen atmosphere of super high purity. At first, 1200 ml of anhydrous chlorobenzene was introduced into the vessel and then 1.13 millimol of tungsten catalyst was added to it. The solution turned a deep red color.

In the next step, 400 ml of cyclopentene was introduced and after standing for a while, the content was cooled to −5°C. Then, polymerization reaction commenced and there was added 2.26 millimol of tri-isobutyl aluminum.

Concurrently, 150 ml of chlorobenzene was introduced into a dropping funnel replaced by nitrogen atmosphere. Then, 0.05 millimole of tungsten catalyst and 20 ml of dicyclopentadiene (5 volumne percent of cyclopentene) were added to it. The formation of complex compound was sufficiently under way until the color of the solution changed from red to dark red.

The complex compound formed was dropwisely charged to the cyclopentene solution under a polymerization reaction. This charge took about 2 hours.

The copolymerization reaction was continued for 5 hours in total and then the reaction was stopped with ethanol amine. Further, there were added an anti-aging agent and methanol in an amount of 10 times that of the reaction mixture; the polymer was precipitated. The obtained rubber-like copolymer was dried up to a constant weight, in a vacuum dryer. The weight of the product was 223 g and the degree of conversion was 68%. The Mooney viscosity of the obtained raw rubber was 47.

EXAMPLE 2.

Treating just the same as in Example 1, 1100 ml of an chlorobenzene was introduced into a polymerization vessel, and 1.5 millimole of tungsten catalyst and 350 ml of cyclopentene were added to it. After cooling to −10°C, 3.0 millimole of tri-isobutyl aluminum was added to begin polymerization reaction.

Next, 150 ml of anhydrous chlorobenzene, 0.05 millimole of tungsten catalyst and 35 ml of dicyclopentene (10 volume percent of cyclopentene) were received in a dropping funnel replaced by nitrogen atmosphere, for 1 hour to form a complex compound. The complex compound was charged dropwisely to the solution of cyclopentene under polymerization. The copolymerization reaction was continued for 5 hours in total and then the reaction was stopped.

The obtained amount of the product was 269 g and the degree of conversion was 78.4%. The Mooney viscosity of the raw rubber so obtained was 27. Five grams of the obtained product was extracted by a Soxhlet's extractor with n-hexane and after the extraction for 24 hours, the sample was found to be completely soluble in not n-hexane.

A homopolymer of dicyclopentadiene prepared by polymerization using the same conditions as described above, was insoluble to hot n-hexane. It can be thus concluded, that the copolymer obtained in Example 2 does not contain homopolymer of dicyclopentadiene.

Example 3.

Treating just the same as in Example 1, 1000 ml of chlorobenzene, 1.31 millimole of tungsten catalyst and 330 ml of cyclopentene were introduced into a polymerization vessel and the mixture was cooled down to −10°C. When polymerization reaction commenced there was added 2.65 millimole of triisobutyl aluminum.

In the next step, 50 ml of anhydrous chlorobenzene, 0.08 millimole of tungsten catalyst and 50 ml of dicyclopentadiene (15 volume percent of cyclopentene) were reacted with each other at room temperature for 1 hour to form a complex compound in a dropping funnel replaced by nitrogen atmosphere. Then, the solution of the complex compound was added to the cyclopentene solution dropwisely, taking about 4 hours for dropping. The copolymerization was further continued for 5 hours in total and then the polymerization reaction was stopped as in Example 1.

The amount of obtained product was 199 g and the degree of conversion was 65.7%. Then, 5 g of the obtained copolymer was extracted using n-hexane as a solvent. The sample was found to be completely soluble to hot n-hexane after continuous extraction for 48 hours. The conclusion is that the obtained copolymer does not contain homopolymer of dicyclopentadiene.

COMPARATIVE EXAMPLE 1.

Treating just the same as in Example 1, 1200 ml of anhydrous chlorobenzene, 1.13 millimole of tungsten catalyst and 400 ml of cyclopentene were introduced into a polymerization vessel and after cooling to −10°C, 2.26 millimole of triisobutyl aluminum was added to the cyclopentene solution to start polymerization reaction. Next, into a dropping funnel replaced by nitrogen atmosphere, 100 ml of anhydrous chlorobenzene and 20 ml of dicyclopentadiene (5 volume percent of cyclopentene) were introduced, but tungsten catalyst was not introduced into the funnel. The mixture was fed into the cyclopentene solution dropwisely for 1 hour. After polymerization was continued for 5 hours in total, the conversion rate was found to be 36.6 percent. The Mooney viscosity of the obtained raw rubber was as high as 200 and roll work was already impossible. The Mooney viscosity of the hompolymer of cyclopentene without using dicyclopentadiene was less than 10.

It is clearly seen that a substantial stepwise increase of Mooney viscosity from less than 10 to more than 200 occured by the dropwise addition of dicyclopentadiene which was not formed into a complex compound with the tungsten catalyst.

Moreover, the product in Comparative Example 1 was scarce in stickiness and also in transparency. An extraction test of the product for 48 hours with a Soxhlet's extractor using n-hexane showed the existence of a small amount of homopolymer of dicyclopentadiene insoluble to hot n-hexane. Comparative Example 2.

Treating just the same as in Example 1, 1200 ml of anhydrous chlorobenzene, 1.13 millimole of tungsten catalyst, 400 ml of cyclopentene and 20 ml of dicyclopentadiene (5 volume percent of cyclopentene) were introduced into a polymerization vessel together at once. After settling for a while, the mixture was cooled down to −10°C and 2.26 millimole of triisobutyl aluminum was added to the mixture to start polymerization reaction.

After polymerization for 5 hours, the conversion became 49% and the Mooney viscosity of the obtained raw rubber was 158.

COMPARATIVE EXAMPLE 3.

A one component polymerization of cyclopentene without adding dicyclopentadiene, was carried out in the same way as in Comparative Example 2. The conversion rate after 5 hours of polymerization time was 72 % and the Mooney viscosity of the obtained raw rubber was less than 10. Therefore, in case of this comparative Example 3, it is clear that a substantial stepwise increase of molecular weight of the resulting polymer took place.

The raw rubbers obtained in the above examples were vulcanized at 140°C for 30 minutes using the following recipe, and the physical and mechanical properties of the vulcanized products were tested.

| Mixing Recipe for Vulcanization | Parts by weight |
|---|---|
| Copolymer | 100 |
| Carbon black (ISAF) | 50 |
| Aromatic oil | 10 |
| ZnO | 3 |
| Stearic Acid | 3 |
| Anti-aging agent | 1.1 |
| Accelerator for vulcanization (CZ) | 0.6 |
| Sulphur | 1.8 |

Workability of the obtained copolymers were tested, wherein the processability was evaluated in mixing operation on a roll. The copolymers obtained in Examples 1 to 3 had good processability, much better than those obtained in Comparative Examples 1 and 2, showing superior stickness on the surface of the roll.

Physical and Mechanicla Properties of the Vulcanized Products of Copolymers

| | [1]Homopolymer | Ex. 1 | Ex. 2 | Com. Ex. 2 |
|---|---|---|---|---|
| Tensile Strength[2] (kg/cm$^2$) | 228 | 220 | 234 | 208 |
| Breaking elongation[2] (%) | 486 | 543 | 521 | 472 |
| Tensile stress at 300% elongation (kg/cm$^2$)[2] | 118 | 108 | 119 | 110 |
| Hardness[2] | 64 | 63 | 67 | 65 |
| Resilience[2] (%) | 60 | 54 | 54 | 50 |
| Tear resistance[3] (kg/cm$^2$) | 32 | 45 | 51 | 37 |
| Permanent compression set[4] at low temperature (%) | 100 | 80 | 62 | 99 |

Remarks
[1]The Mooney viscosity of the homopolymer was 53.
[2]Observations were carried out based on JIS K6301
[3]Observed values by JIS B-type
[4]Observed value of permanent deformation of every sample compressed at −20°C for 20 hours.
(JIS is the abbreviation for Japanese Industrial Standard).

The foregoing description is intended for purposes of illustrating the principles of the invention. Numerous variations and modifications thereof would be apparent to the worker skilled in the art. All such variations and modifications are to be considered to be within the spirit and scope of the invention.

What is claimed is:

1. Method of producing a copolymer of cyclopentene comprising the steps of
   preliminarily mixing in an inert solvent a polycyclic olefin and a catalyst comprising at least tungsten or molybdenum compound, to form a complex compound;
   polymerizing cyclopentene in an inert solvent containing a catalyst comprising at least tungsten or molybdenum compound and an organometallic compound; and
   adding said complex compound to the polymerizing cyclopentene.

2. The method of claim 1, wherein said polycyclic olefin is selected from the group consisting of dicyclopentadiene, norbornene norbornadiene and tricyclopentadiene, and is in an amount of from 1 to 50 percent by weight of the amount of said cyclopentene.

3. The method of claim 2, wherein said polycyclic olefin comprises 1 to 30 percent by weight.

4. The method of claim 1, wherein the ratio of said polycyclic olefin to inert solvent is between 10/1 to 0.01/1 by weight, and the molar ratio of said polycyclic olefin to tungsten compound is between 500/1 to 50.0/1.

5. The method of claim 1, wherein the molar ratio of said organometallic compound to said tungsten or molybdenum compound is within the range of 0.1/1 to 50/1, and said tungsten or molybdenum compound is used in an amount of between 0.01 to 10 millimole percent based on the amount of cyclopentene.

6. The method of claim 5, wherein said molar ratio is between 0.1/1 to 10/1.

7. The method of claim 1, wherein said cyclopentene is copolymerized with a monoolefin of alpha olefin or beta olefin, said monoolefin being within the range of 0.01 to 10 weight percent based on the amount of cyclopentene, and said solvent is selected from the group consisting of cyclohexane, n-hexane, toluene, and chlorobenzene; and wherein said polymerization is carried out at a temperature within the range of −60°C to 70°C.

8. Method of claim 1, wherein said catalyst further comprises a co-catalyst selected from the group consisting of epoxide compounds, alcohols, and peroxides, and wherein the ratio of said co-catalyst to said tungsten or molybdenum is within the range of 0 to 10/1.

9. Method of claim 1, wherein the catalyst mixed with said polycyclic olefin comprises tungsten oxide and aluminum chloride, and wherein said catalyst for polymerization comprises tungsten oxide, aluminum chloride, and triisobutyl aluminum.

10. Copolymer produced by the method of claim 1.

11. Copolymer produced by the method of claim 7.

* * * * *